United States Patent
Wake et al.

(10) Patent No.: US 7,767,352 B2
(45) Date of Patent: Aug. 3, 2010

(54) FUEL CELL SYSTEM AND CHARGE AMOUNT ADJUSTMENT METHOD FOR ENERGY STORAGE

(75) Inventors: Chihiro Wake, Shioya-gun (JP); Koichiro Miyata, Utsunomiya (JP); Jumpei Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 974 days.

(21) Appl. No.: 11/498,212

(22) Filed: Aug. 1, 2006

(65) Prior Publication Data
US 2007/0026278 A1 Feb. 1, 2007

(30) Foreign Application Priority Data
Aug. 1, 2005 (JP) ............... 2005-222671

(51) Int. Cl.
H01M 8/00 (2006.01)
H01M 8/04 (2006.01)
(52) U.S. Cl. ..................... 429/429; 429/428
(58) Field of Classification Search ............ 429/13, 429/24, 26, 22; 307/66
See application file for complete search history.

(56) References Cited

U.S. PATENT DOCUMENTS 6,158,537 A * 12/2000 Nonobe ................. 429/13
6,672,415 B1   1/2004 Tabata et al.

FOREIGN PATENT DOCUMENTS

| DE | 19731250 A1 | 1/1998 |
| DE | 60007917 T2 | 10/2004 |
| JP | 2002-289209 | 10/2002 |
| JP | 2003-331893 | 11/2003 |
| JP | 2004-265771 | 9/2004 |
| JP | 2005-50638  | 2/2005 |
| JP | 2006-179472 | 7/2006 |

OTHER PUBLICATIONS

German Office Action for Application No. 102006035851.1-45, dated Mar. 5, 2006.
Japanese Office Action for Application No. 2005-222671, dated Feb. 16, 2010.

* cited by examiner

*Primary Examiner*—Dah-Wei D Yuan
*Assistant Examiner*—Stephan Essex
(74) *Attorney, Agent, or Firm*—Lahive & Cockfield, LLP; Anthony A. Laurentano, Esq.

(57) ABSTRACT

When it is detected that the ignition switch is turned off a short period of time after the ignition switch turned on at the temperature below the freezing point, the charge threshold of a capacitor is changed to a larger charge threshold C for increasing the amount of electrical energy charged in the capacitor based on the charge threshold C. The capacitor is used for performing a scavenging process for a sufficient period of time. At the time of starting operation of the fuel cell system at the temperature below the freezing point the next time, using the electrical energy of the capacitor, a fuel cell is warmed rapidly by a heater or the like to start operation of the fuel cell system.

3 Claims, 4 Drawing Sheets

FIG. 3 to a fuel cell system including a fuel cell and an energy storage which is charged by the power generation current of the fuel cell, and assists the output of the fuel cell. Further, the present invention relates to a method of adjusting the amount of electrical energy charged in the energy storage. In particular, the present invention relates to a fuel cell system and a method of adjusting the amount of electrical energy charged in an energy storage of the fuel cell system in which when power generation of the fuel cell system is stopped, a scavenging process is performed for an anode system in preparation for starting operation of the fuel cell system at low temperature such as the temperature below the freeing point.

2. Description of the Related Art

For example, a solid polymer fuel cell employs a membrane electrode assembly which includes an anode (fuel electrode) and a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces an electrochemical reaction of the fuel gas to split the hydrogen molecule into hydrogen ions and electrons. The hydrogen ions move toward the cathode through the suitably humidified electrolyte membrane, and the electrons flow through an external circuit to the cathode, creating DC electrical energy. Further, in the fuel cell, an oxygen-containing gas such as the air is supplied to the oxygen-containing gas flow field, and the oxygen-containing gas flows along the cathode for inducing an electrochemical reaction. At the cathode, hydrogen ions from the anode combine with the electrons and oxygen to produce water. The water is also retained at the anode, e.g., due to the back diffusion from the cathode or high humidification of the fuel gas.

If the water is excessively present at any of the electrodes, water clogging may occur. In view of the above, in the fuel cell system, a technique of the scavenging process as disclosed in Japanese Laid-Open Patent Publication No. 2003-331893 is proposed. In the scavenging technique, when operation of the fuel cell system is started or finished, an oxygen-containing gas is supplied to the anode in addition to the cathode for removing the water produced in the power generation from the membrane electrode assembly or the separators of the fuel cell.

In order to perform the scavenging process for the anode and/or the cathode, an energy source other than the fuel cell is required. Thus, in the fuel cell system, an energy storage such as a capacitor or a battery is mounted for assisting the output of the fuel cell.

When an ignition switch is turned off (power generation stop request), in the fuel cell system, the scavenging process is performed using the electrical energy stored in the energy storage in preparation for the next start-up operation of the fuel cell system, before stopping operation of the fuel cell system.

However, after the fuel cell system is stopped, if it becomes necessary to start operation of the fuel cell system at low temperature such as the temperature below the freezing point due to the decrease in the outside air temperature, it has been found that, in some cases, it becomes difficult to restart operation of the fuel cell system at low temperature such as the temperature below the freeing point. For example, this is caused by the decrease in the remaining electrical energy stored in the energy storage since the energy is consumed in the scavenging process.

Further, in the case where operation of the fuel cell system is started at low temperature such as the temperature below the freezing point, before the fuel cell is warmed up, the ignition switch may be turned off by a driver. Therefore, if operation of the fuel cell system is stopped after operation of the fuel cell system is started at the temperature below the freezing point, and power generation is performed for a short period of time, stated otherwise, if operation of the fuel cell system is stopped by the driver's operation in a short period of time after operation of the fuel cell is started at the temperature below the freezing point, it has been found that, in some cases, the fuel cell system becomes unstable unless a long scavenging process is performed, e.g., due to the insufficient activity of the electrolyte membrane. That is, it has been found that if operation of the fuel cell system is stopped after temporal start-up at low temperature, in some cases, it becomes very difficult to restart operation of the fuel cell system at low temperature such as the temperature below the freezing point, due to the further decrease of the remaining electrical energy in the energy storage.

SUMMARY OF THE INVENTION

The present invention has been made taking the problems into consideration, and an object of the present invention is to provide a fuel cell system and a method of adjusting the amount of electrical energy stored in an energy storage in which even if a driver stops operation of the fuel cell system after temporal start-up at low temperature, a scavenging process is performed reliably, and operation of the fuel cell system is started reliably at low temperature such as the temperature below the freezing point.

In a fuel cell system according to the present invention, means for determining whether a power generation stop request is a request to stop operation of the fuel cell system after temporal start-up at low temperature, and means for adjusting the charge amount for the energy storage (amount of electrical energy charged in the energy storage) when the power generation is stopped are provided. In response to a power generation stop request during power generation operation after starting operation of the fuel cell system, the determination means determines that the power generation stop request is a request to stop operation of the fuel cell system after temporal start-up at low temperature, if the temperature of the fuel cell is not higher than a predetermined temperature, and operation of the fuel cell system is started at low temperature before the power generation stop request, and when the determination means determines that the power generation stop request is a request to stop operation of the fuel cell system after temporal start-up at low temperature, the adjustment means adjusts the charge amount for the energy storage to become larger than the charge amount at the time of operation stop at normal temperature. In the system, even if operation of the fuel cell system is stopped after temporal start-up at low temperature, the scavenging process is performed reliably by the energy storage, and the next time, operation of the fuel cell system is started reliably at low temperature such as the temperature below the freezing point.

Further, the charge amount is adjusted by the adjustment means to satisfy the magnitude relationship of "the charge amount at the time of operation stop after temporal start-up at low temperature>the charge amount at the time of operation stop after start-up at low temperature >the charge amount at the time of operation stop at normal temperature". Thus, under the respective determination conditions, the time required for charging the energy storage in response to the power generation stop request is minimized.

Further, the determination means determines that the power generation stop request is a request to stop operation of the fuel cell system after temporal start-up at low temperature, if the temperature of the fuel cell when operation of the fuel cell system is started prior to the power generation stop request is not higher than a first threshold temperature, and the temperature of the fuel cell when the power generation stop request is inputted is not higher than a second threshold temperature which is higher than the first threshold temperature. Thus, the determination can be made further reliably.

According to a method of adjusting the charge amount for an energy storage of a fuel cell system, steps of determining whether a power generation stop request is a request to stop operation of the fuel cell system after temporal start-up at low temperature and adjusting the charge amount for the energy storage when the power generation is stopped are provided. In response to a power generation stop request during power generation operation after starting operation of the fuel cell system, in the determination step, it is determined that the power generation stop request is a request to stop operation of the fuel cell system after temporal start-up at low temperature, if the temperature of the fuel cell is not higher than a predetermined temperature, and operation of the fuel cell system is started at low temperature before the power generation stop request, and when it is determined that the power generation stop request is a request to stop operation of the fuel cell system after temporal start-up at low temperature in the determination step, the charge amount for the energy storage is adjusted to become larger than the charge amount at the time of operation stop at normal temperature in the adjustment step. In the method, even if operation of the fuel cell system is stopped after temporal start-up at low temperature, the scavenging process is performed reliably by the energy storage, and the next time, operation of the fuel cell system is started reliably at low temperature such as the temperature below the freezing point.

The charge amount is adjusted in the adjustment step to satisfy the magnitude relationship of "the charge amount at the time of operation stop after temporal start-up at low temperature>the charge amount at the time of operation stop after start-up at low temperature>the charge amount at the time of operation stop at normal temperature". Thus, under the respective determination conditions, the time required for charging the energy storage in response to the power generation stop request is minimized.

In the determination step, it is determined that the power generation stop request is a request to stop operation of the fuel cell system after temporal start-up at low temperature, if the temperature of the fuel cell when operation of the fuel cell system is started prior to the power generation stop request is not higher than a first threshold temperature, and the temperature of the fuel cell when the power generation stop request is inputted is not higher than a second threshold temperature which is higher than the first threshold temperature. Thus, the determination can be made further reliably.

According to the present invention, in the fuel cell system, when operation of the fuel cell system is stopped after temporal start-up at low temperature, the charge amount for the energy storage is adjusted to become larger than the charge amount in the case of the normal operation stop. Thus, the scavenging process is performed reliably, and the next time, operation of the fuel cell system is started reliably at low temperature such as the temperature below the freezing point.

As a result, the time required for the scavenging process during the power generation stop at normal temperature is minimized.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, an embodiment of the present invention will be described with reference to the drawings.

Figure 1:
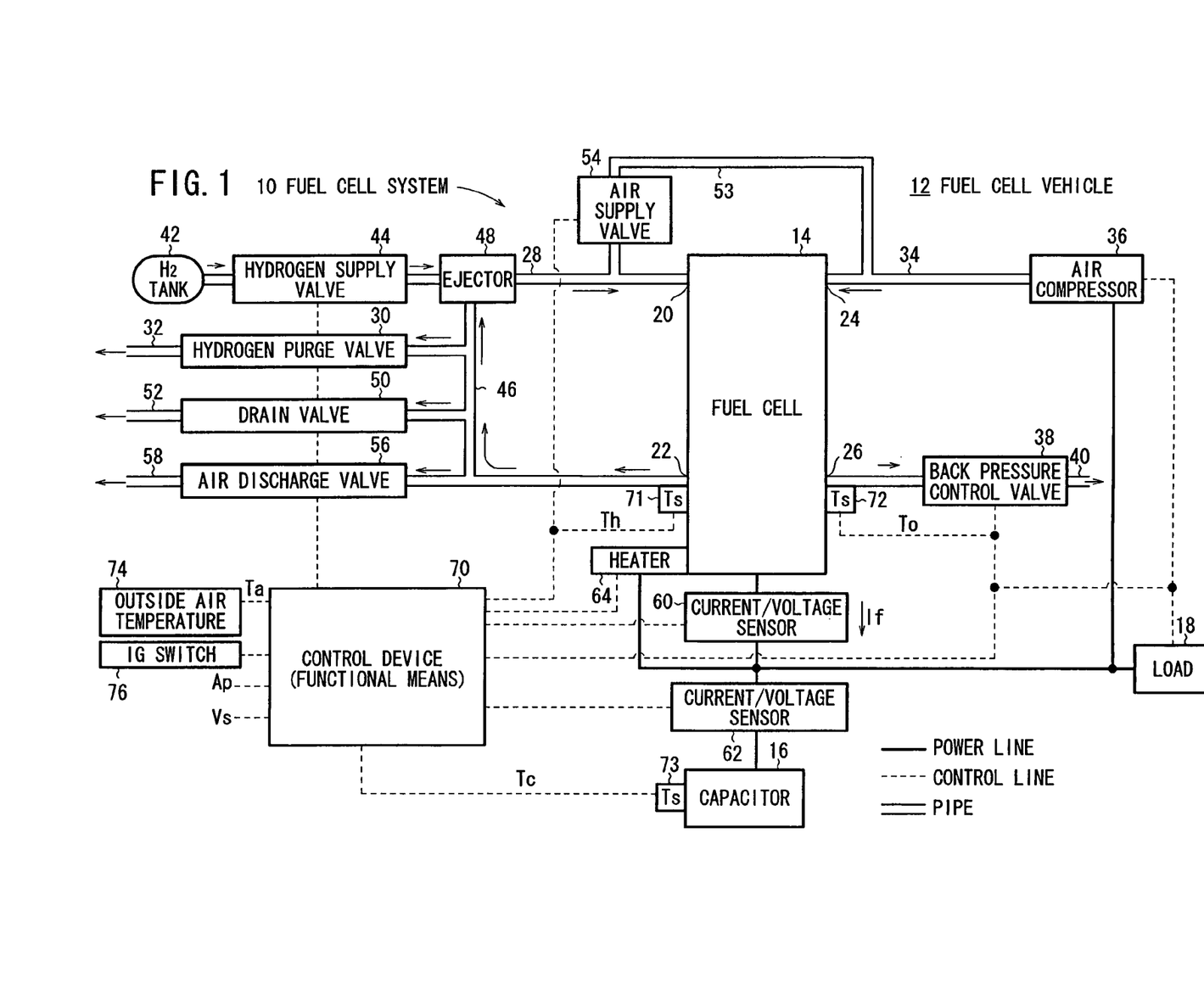
FIG. 1 is a diagram schematically showing structure of a fuel cell vehicle equipped with a fuel cell system according to an embodiment of the present invention.

FIG. 1 is a diagram schematically showing structure of a fuel cell vehicle 12 including a fuel cell system 10 according to the embodiment of the present invention.

Basically, the fuel cell vehicle 12 includes a fuel cell 14, and a capacitor 16 as an energy storage for assisting the output of the fuel cell 14, and a load 18 such as a drive motor for traveling, and auxiliary devices such as an air compressor 36 or the like. The capacitor 16 is charged by the power generation current If generated in the fuel cell 14. As the energy storage, for example, a battery may be used instead of the capacitor 16. Alternatively, both of the capacitor 16 and the battery may be used.

The fuel cell 14 has stack structure formed by stacking a plurality of cells each including an anode, a cathode, and a solid polymer electrolyte membrane interposed between the anode and the cathode.

The fuel cell 14 has a hydrogen supply port 20 for supplying a fuel gas such as a hydrogen ($H_2$) gas to the fuel cell 14, a hydrogen discharge port 22 for discharging an exhaust gas from the fuel cell 14 (the exhaust gas contains the hydrogen gas which has not been consumed in the power generation), an air supply port 24 for supplying an oxygen-containing gas such as the air containing oxygen ($O_2$) to the fuel cell 14, and an air discharge port 26 for discharging the air containing unconsumed oxygen from the fuel cell 14.

A temperature sensor 71 is provided near the hydrogen discharge port 22, and a temperature sensor 72 is provided near the air discharge port 26. The temperature sensor 71 measures the temperature Th of the gas in the hydrogen discharge port 22, and the temperature sensor 72 measures the temperature To of the gas in the air discharge port 26. Further, though not shown, a coolant channel is provided in the fuel cell 14, and a temperature sensor for measuring the temperature of the coolant is provided near the outlet of the coolant channel.

A hydrogen supply channel 28 is connected to the hydrogen supply port 20. An ejector 48 is provided in the hydrogen supply channel 28. A hydrogen tank 42 stores a high pressure hydrogen, and the hydrogen gas is supplied from the hydrogen tank 42 to the ejector 48 through a hydrogen supply valve 44. The ejector 48 supplies the hydrogen gas to the fuel cell 14 through the hydrogen supply channel 28 and the hydrogen supply port 20. Further, the ejector 48 sucks the exhaust gas containing the unconsumed hydrogen gas which has not been consumed in the fuel cell 14 such that the exhaust gas is discharged to a hydrogen circulation channel 46 connected to the hydrogen discharge port 22. The exhaust gas sucked by the ejector 48 is supplied again to the fuel cell 14.

A hydrogen purge valve 30 is provided in the hydrogen circulation channel 46. The hydrogen purge valve 30 is opened as necessary. When the hydrogen purge valve 30 is opened, the fuel gas containing the water retained in the anode and the nitrogen gas mixed into the anode from the cathode through the electrolyte membrane is discharged to the outside through a hydrogen purge channel 32 and a dilution box (not shown). Thus, the power generation stability is achieved. Further, a drain valve 50 is provided in the hydrogen circulation channel 46. The drain valve 50 discharges water retained in a catch tank (not shown) in the hydrogen circulation channel 46 to the outside through a water discharge channel 52. Further, an air discharge valve 56 is provided in the hydrogen circulation channel 46. When the air discharge valve 56 is opened, the water retained at the anode or the separator, or the residual fuel gas is discharged together with the air which has been supplied from the hydrogen supply port 20 into the fuel cell 14 at the time of the scavenging process, from the hydrogen discharge port 22 to the outside through an air discharge channel 58.

The air discharge valve 56, air supply valve 54, and the hydrogen purge valve 30 are ON/OFF valves.

An air supply channel 34 is connected to the air supply port 24. An air compressor 36 is connected to the air supply channel 34. The air compressor 36 includes a compressor motor for compressing the atmospheric air from the outside, and supplying the compressed air to the fuel cell 14.

Further, a back pressure control valve 38 is provided at the air discharge port 26. The back pressure control valve 38 regulates the pressure of the air supplied to the fuel cell 14 through the air supply channel 34 and the air supply port 24. The air discharge port 26 of the fuel cell 14 is connected to the outside through the back pressure control valve 38 and an air discharge channel 40.

Further, the air supply valve 54 is provided between the hydrogen supply channel 28 and the air supply channel 34 connected to the fuel cell 14. The air supply valve 54 is opened at the time of supplying the compressed air into the hydrogen supply port 20 through the air inlet channel 53, i.e., at the time of the anode scavenging process.

Further, in the fuel cell system 10, and the fuel cell vehicle 12 equipped with the fuel cell system 10, a control device 70 is provided. The control device 70 controls the entire operation of the fuel cell system 10 and the fuel cell vehicle 12.

The control device 70 comprises a computer, and operates as means for achieving various functions by executing programs stored in a memory based on various inputs. In the embodiment, for example, the control device 70 is operated as means for allowing operation of the fuel cell system 10 to be started at low temperature, means for determining whether a power generation stop request is a request to stop operation of the fuel cell system 10 after temporal start-up at low temperature, means for adjusting the charge amount for the capacitor 16, threshold changing means, means for detecting (calculating) the remaining electrical energy stored in the capacitor 16, and counter (timer) means.

In FIG. 1, solid lines denote power lines, dotted lines denote signal lines such as a control line, and double lines denote pipes.

During normal power generation operation of the fuel cell system 10, by the valve control of the control device 70, basically, the hydrogen supply valve 44 is opened, and the back pressure control valve 38 is opened by the suitable degree. Though the hydrogen purge valve 30 and the drain valve 50 are opened as necessary, normally, the hydrogen purge valve 30 and the drain valve 50 are closed. Further, the air supply valve 54 and the air discharge valve 56 are closed.

During the normal power generation operation, the air (oxygen) is supplied from the air compressor 36 to the cathode of the fuel cell 14, and the hydrogen gas is supplied from the high pressure hydrogen tank 42 to the anode. At the anode, the hydrogen is split into hydrogen ions and electrons. The hydrogen ions move toward the cathode through the solid polymer electrolyte membrane. The electrons are collected as the power generation current If by an external circuit.

In this manner, during the normal power generation operation with fuel cell 14 using the reactant gases, the power generation current If collected from the fuel cell 14 is supplied to the load (electrical load) 18 and a driving motor of the air compressor 36 through a current/voltage sensor 60. Further, the power generation current If is also supplied to the capacitor 16 through a current/voltage sensor 62 for charging the capacitor 16. The remaining electrical energy stored in the capacitor 16 is regulated by the control device 70 based on the output of the current/voltage sensor 62, and data of the remaining electrical energy is stored in the memory.

For example, the capacitor 16 is an electric double layer capacitor. The capacitor 16 is charged by the power generation current If from the fuel cell 14 under the control of the control device 70. Mainly, when power generation of the fuel cell 14 is stopped, the electrical energy (electricity) stored in the capacitor 16 is supplied to the load 18 and the air compressor 36. Further, the electrical energy stored in the capacitor 16 is supplied to a heater 64 for warming the fuel cell 14 at the time of starting operation of the fuel cell system 10 at low temperature, such as the temperature below the freezing point. The capacitor 16 assists the output of the fuel cell 14. During deceleration of the fuel cell vehicle 12, the driving force is transmitted from the drive wheels to the drive motor as the load 18. At this time, the drive motor functions as a power generator, and generates the so called regenerative braking force. Thus, it is possible to collect kinetic energy of the vehicle body as electrical energy. From the load 18, regeneration of the electrical energy is performed, i.e., the electrical energy is stored in the capacitor 16.

During normal power generation operation, in the fuel cell vehicle 12 equipped with the fuel cell system 10, the control device 70 calculates the required electrical power based on the pedal position Ap of an accelerator pedal (not shown) or the vehicle speed Vs or the like. Based on the calculated required electrical power, the control device 70 implements various controls, i.e., sends control signals to the fuel cell 14, the load 18, the air compressor 36, and the back pressure control valve 38 or the like. Further, in order to reliably implement the control of the load 18, and the control at the time of starting operation of the fuel cell system 10 at low temperature such as the temperature below the freezing point, the control device 70 retrieves signals indicating the power generation current If, the current flowing into the capacitor 16, the voltage Vc of the capacitor 16, the temperature Tc of the capacitor 16, the outside air temperature Ta, the temperature Th of the gas in the hydrogen discharge port 22, and the temperature To of the gas in the air discharge port 26 from the current/voltage sensors 60, 62, the temperature sensor 73 of the capacitor 16 as means for detecting the temperature of the energy storage, an outside air temperature sensor 74, and the temperature sensors 71, 72. Based on the signals, the control device 70 keeps track of the remaining electrical energy and the required remaining electrical energy stored in the capacitor 16.

Further, an ignition switch (IG (IGN) switch) 76 is connected to the control device 70. The ignition switch 76 outputs a start-up signal (signal for starting operation) and a stop signal (signal for stopping operation) for the fuel cell vehicle 12 and the fuel cell system 10.

The basic structure and operation of the fuel cell system 10 and the fuel cell vehicle 12 equipped with the fuel cell system 10 have been described above. Next, operation of the fuel cell system 10 and the fuel cell vehicle 12 will be described with reference to flowcharts in FIGS. 2 and 3, and a time chart in FIG. 4. The time chart in FIG. 4 shows operation in the case of making determination by means for determining whether a power generation stop request is a request to stop operation of the fuel cell system 10 after temporal start-up at low temperature.

Figure 2:
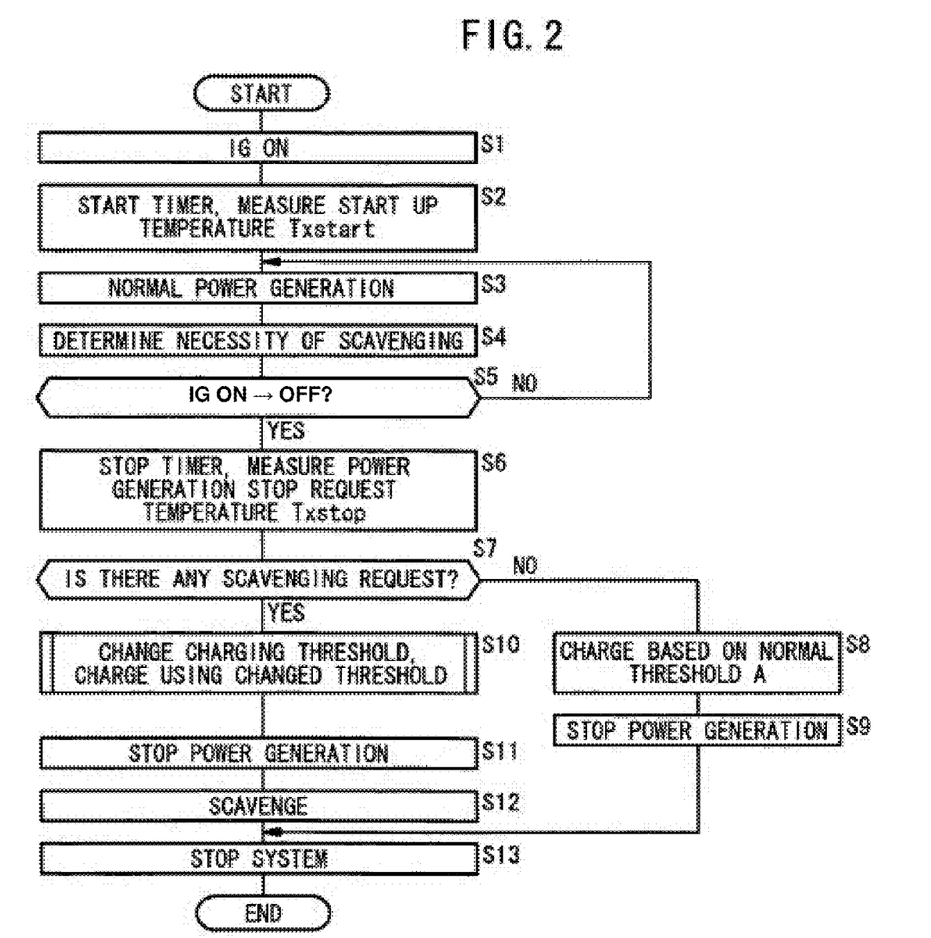
FIG. 2 is an overall flowchart showing operation in the embodiment of FIG. 1.

In step S1, when the control device 70 detects an ON signal (signal for changing the ON state to the OFF state) of the ignition switch 76 as a start-up signal for starting operation of the fuel cell system 10 (see time t0 in the time chart), the operation start time (start-up time) tstart=t0 is memorized (the timer is started). Further, in step S2, the control device 70 obtains the temperature Txstart (at least one of the temperature Th of the gas in the hydrogen discharge port 22, the temperature To of the gas in the air discharge port 26, and the temperature of the coolant near the outlet of the coolant channel (not shown)) from the temperature sensors 71, 72. In the embodiment, the temperature Th of the gas in the hydrogen discharge port 22 (hereinafter referred to as the start-up temperature) is measured. That is, the temperature Th of the gas in the hydrogen discharge port 22 is the start-up temperature (Th=Txstart).

Next, in step S3, the above-described normal power generation operation of the fuel cell 14 is performed. At the time of starting operation at low temperature such as the temperature below the freezing point (in this case, the outside air temperature sensor 74 confirms that the outside air temperature Ta is below the freezing point), the heater 64 is energized for a certain period of time by the electrical energy stored in the capacitor 16 for warming the fuel cell 14 rapidly.

During normal power generation operation of the fuel cell 14, in step S4, constantly, it is determined whether the scavenging process is required or not. Specifically, in the embodiment, it is determined whether the scavenging process for allowing operation of the fuel cell system 10 at the temperature below the freezing point is required or not.

That is, in the embodiment, in order to smoothly start operation of the fuel cell system 10 at low temperature, when the fuel cell system 10 is stopped, i.e., when the fuel cell system 10 is switched from the ON state to the OFF state, if it is predicted that operation will be started at low temperature the next time, based on the current outside air temperature Ta or the like, the scavenging process is performed.

Determination as to whether the scavenging process is required or not in step S4 is made as follows. When the ignition switch 76 is in the ON state, if the minimum value of the outside air temperature Ta detected by the outside air temperature sensor 74 of the fuel cell vehicle 12 is a predetermined value or less, since the outside air temperature Ta may become the temperature below the freezing point after the ignition switch 76 is turned off, it is determined that the scavenging process is required. Thus, a scavenging flag is set.

Next, in step S5, it is determined whether the ignition switch 76 has been switched from the ON state to the OFF state.

If it is determined that the ignition switch 76 has been switched from the ON state to the OFF state as shown at time t1, in step S6, operation (power generation) stop request time (stop request time) tstop=t1 is memorized (otherwise, the timer started in step S2 is stopped). Further, the temperature Txstop when the ignition switch 76 is turned off (power generation stop request temperature) is obtained. In the embodiment, the temperature Th of the gas in the hydrogen discharge port 22 is measured as the power generation stop request temperature Txstop (Th=Txstop)

Then, in step 7, it is determined whether there is a scavenging process request based on the presence of the scavenging flag as the determination result in step S4.

In step S7, if it is determined that the scavenging process is not required, in the absence of the scavenging flag, the charge threshold Cth for charging the capacitor 16 by the power generation current If is a normal charge threshold A (see FIG. 4), and in step S8, charging of the capacitor 16 is carried out until the SOC (State Of Charge) [%] of the capacitor 16 reaches the charge threshold A. Instead of the state of charge SOC, the amount of charged electrical energy [Δ×Wh] may be used as the charge threshold A. Alternatively, since the state of the charge of the capacitor 16 is in proportion to the charge voltage (terminal voltage), the charge voltage may be used as the charge threshold A. Further, instead of the state of charge SOC, the amount of charged electrical energy, or the charge voltage may be used as charge thresholds B and C as described later.

In step S8, when charging of the capacitor 16 by the power generation current If is carried out to reach the normal charge threshold A, in step S9, power generation is stopped. In the power generation stop process, operation of the air compressor 36 is stopped, the hydrogen supply valve 44 and all the other valves 54, 30, 50, 56, and 38 are closed (normal close state). Further, though not shown, the load 18 is disconnected through a contactor (not shown). Thus, the fuel cell system 10 is stopped in step S13. Then, the next start-up signal from the ignition switch 76 is awaited.

In step S7, if it is determined that the scavenging process is required, in the presence of the scavenging flag, in step S10, the charge threshold Cth at the time of charging the capacitor 16 by the fuel cell 14 is changed to a charge threshold B or a charge threshold C shown in FIG. 4. The charge threshold B or the charge threshold C has a large value in comparison with the charge threshold A in the case of charging the capacitor 16 at normal temperature (at normal temperature herein means the state in which the temperature in the fuel cell 14 is 0 [° C.] or more). That is, the process of changing the threshold is performed, and the charging process is performed based on the changed threshold.

Figure 3:
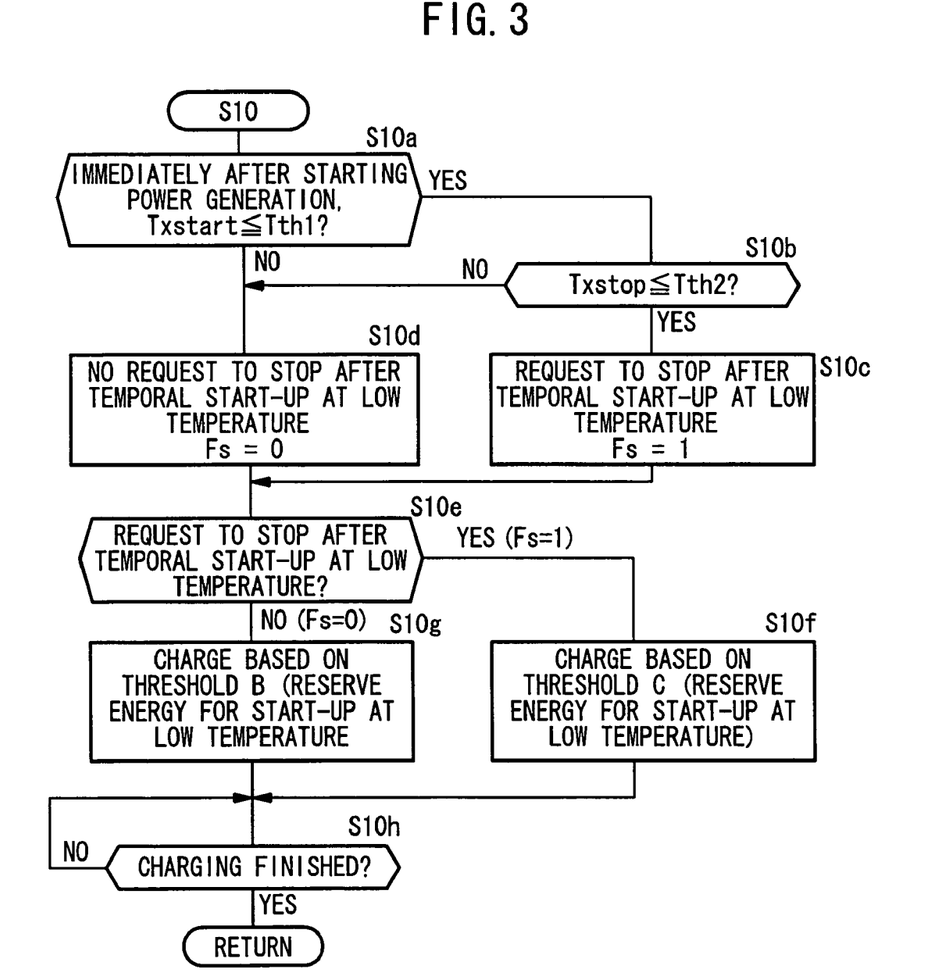
FIG. 3 is a flowchart showing the detail of a charge threshold changing process and a charging process using the changed threshold after an ignition switch is turned off in the overall flowchart in FIG. 2.
Figure 4:
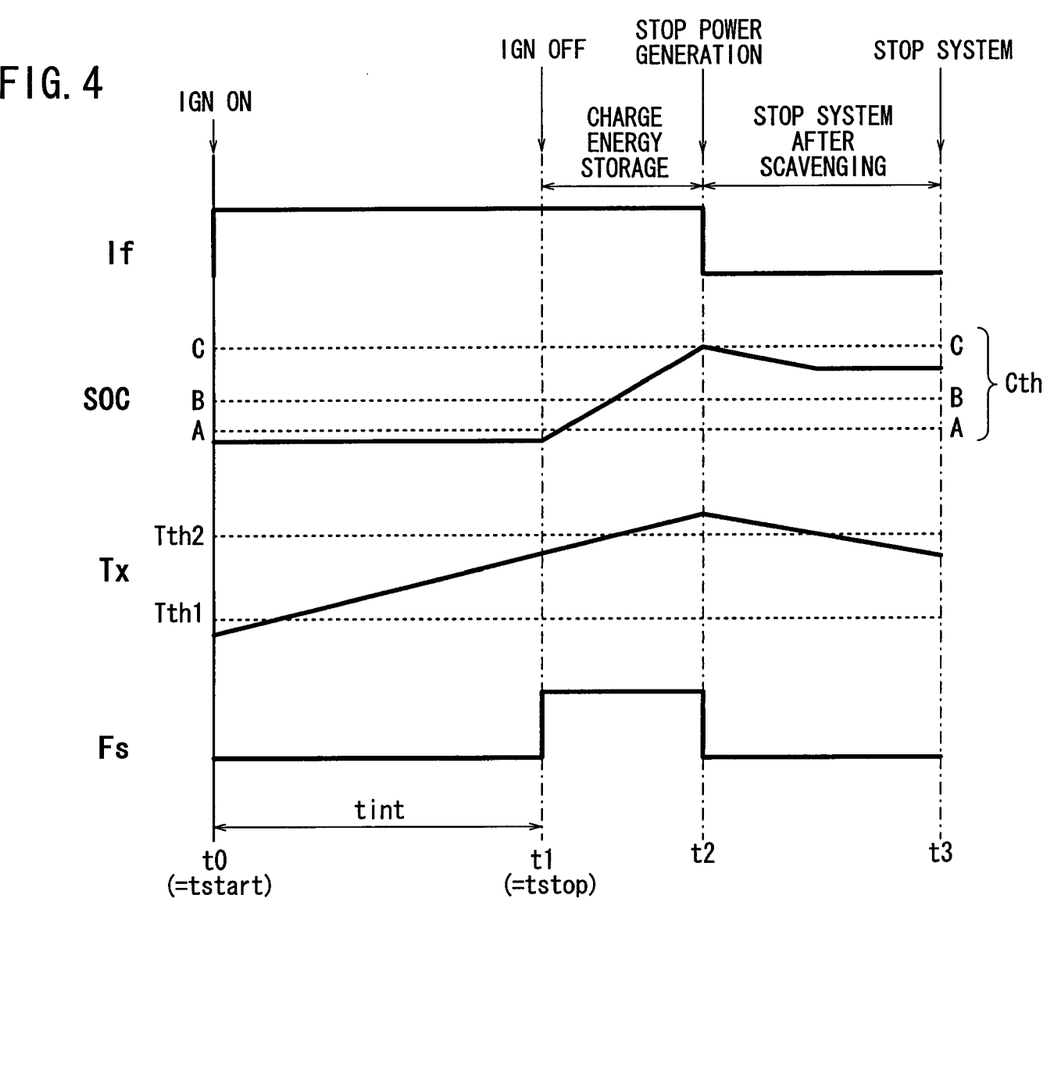
FIG. 4 is a time chart showing operation in the case where a request to stop operation of the fuel cell system after temporal start-up at low temperature is inputted.

FIG. 3 is a flowchart in detail specifically showing the threshold changing process and the process of charging the capacitor 16 based on the changed threshold.

In this case, firstly, in step S10a of FIG. 3, it is determined whether a period of the time tint (hereinafter referred to as the "determination time for stop after temporal start-up") from the operation start time tstart=t0 when the ignition switch 76 is turned on to the operation stop request time tstop=t1 when the ignition switch is turned off (see FIG. 4) is within a predetermined short period of time tshort (several minutes) or not, i.e., whether the ignition switch 76 is turned off immediately after starting power generation or not. At the time, it is determined whether the start-up temperature Txstart obtained in step S2 is not higher than a first threshold temperature Tth (e.g., 0 [° C.] at the freezing point).

The determination in step S10a is YES if the determination time for stop after temporal start-up tint is within the predetermined short period of time (tint≦tshort), and the start-up temperature Txstart is not higher than the first threshold temperature Tth1 (Txstart≦Tth1).

At this time, further, in step S10b, it is determined whether the power generation stop request temperature Txstop at the time t1 when the ignition switch 76 is turned off is not higher than a predetermined second threshold temperature Tth2 (see FIG. 4, e.g., Tth2=10[° C.]) (Txstop≦Tth2), i.e., it is determined whether the fuel cell 14 has not been placed into the normal state.

If the determination is YES, (e.g., if the change of the temperature Tx shown in FIG. 4 occurs), in step S10c, operation of turning off the ignition switch 76 at the time t1 is regarded as operation (the power generation stop request) which satisfies the condition of determining that there is a request to stop operation of the fuel cell system 10 after temporal start-up at low temperature. Thus, a determination flag Fs indicating that there is a request to stop operation of the fuel cell system 10 after temporal start-up at low temperature is set. (Fs=1, see time t1 in FIG. 4).

If the determination in step S10a is NO (if the current time is not immediately after starting power generation, or if the start-up temperature Txstart is higher than the first threshold temperature Tth1), or if the determination in step S10b is NO (if the power generation stop request temperature Txstop at the time t1 when the ignition switch 76 is turned off is higher than a predetermined second threshold temperature Tth2), in step S10d, operation of turning off the ignition switch 76 at the time t1 is not regarded as operation (the power generation stop request) which satisfies the condition of determining that there is a request to stop operation of the fuel cell system 10 after temporal start-up at low temperature. Thus, the determination flag Fs indicating that there is a request to stop operation of the fuel cell system 10 after temporal start-up at low temperature remains unset (Fs=0 is continued).

Next, in step S10e, based on the value of the flag Fs indicating that there is a request to stop operation of the fuel cell system 10 after temporal start-up at low temperature, it is determined whether there is a request to stop operation of the fuel cell system 10 after temporal start-up at low temperature. If the determination is YES (Fs=1), in step S10f, as shown in FIG. 4, at time t1, the charge threshold Cth is changed to the charge threshold C having the largest value. In step S10h, the capacitor 16 is charged up to the charge threshold C by the power generation current If outputted from the fuel cell 14 (see time t2).

In the determination of step S10e, based on the value of the flag Fs indicating that there is a request to stop operation of the fuel cell system 10 after temporal start-up at low temperature, it is determined that there is no request to stop operation of the fuel cell system 10 after temporal start-up at low temperature (Fs=0), since it has been determined that there is a scavenging process request in step S7, in step S10g, at time t1, the charge threshold Cth is changed to the charge threshold B for normally starting operation of the fuel cell system 10 at low temperature such as the temperature below the freezing point. Then, the capacitor 16 is charged up to the charge threshold B by the power generation current If outputted from the fuel cell 14 in step S10h.

Then, in step S11, power generation is stopped (see time t2, the power generation current If is zero). The power generation stop process is performed in the same manner as in the case of step S9. Then, at the time when the power generation is stopped, operation of the air compressor 36 is switched from the state using the electrical energy supplied from the fuel cell 14 to the state using the electrical energy supplied from the capacitor 16.

Then, in step S12, the scavenging process is performed for a certain period of time by monitoring the time using the timer.

That is, in the scavenging process in step S12, in order to supply the compressed air from the compressor 36 to the anode, the compressor 36 operated using the electrical energy supplied from the capacitor 16, firstly, the hydrogen supply valve 44 is closed to stop the supply of the hydrogen gas. Then, the air supply valve 54 at the air inlet channel 53 is opened for supplying the compressed air from both of the hydrogen supply port 20 and the air supply port 26 to the anode and the cathode of the fuel cell 14. The compressed air flows inside the fuel cell 14. Then, the compressed air is discharged from the hydrogen discharge port 22 and the air discharge port 26. At this time, the hydrogen purge valve 30 is opened for a certain period of time for performing the hydrogen purge. Thereafter, the hydrogen purge valve 30 is closed.

Then, the drain valve 50 and the air discharge valve 56 are opened for a certain period of time. By the scavenging air supplied into the fuel cell 14, the water produced in the power generation or the like is reliably removed from the membrane electrode assemblies and the separators. In this case, at the cathode, the water produced in the power generation or the like is discharged from the air discharge port 26 to the outside through the back pressure control valve 38 and the air discharge channel 40, together with the scavenging air. At the anode, the water is discharged from the hydrogen discharge port 22 to the outside through the air discharge valve 56 and the air discharge channel 58 (and the drain valve 50 and the water discharge channel 52), together with the scavenging air.

After the scavenging process, the system is stopped in step S13.

The system stop process is carried out in the same manner as in the case of step S9. Operation of the air compressor 36 is stopped, and the hydrogen supply valve 44 and all the other valves 54, 30, 50, 56, and 38 are closed (normal close state).

As described in the embodiment, after operation of the fuel cell 14 is started, during power generation operation, when a signal indicating that the ignition switch 76 is switched from the ON state to the OFF state as the power generation stop request is inputted to the control device 70, the control device 70 as the determination means determines in step S10a, operation of the fuel cell 14 was started at low temperature at time t0 prior to the power generation stop request at time t1, and in step S10b, if the temperature Th (=Txstop) of the gas in the hydrogen discharge port 22 of the fuel cell 14 at time t1 when the power generation stop is requested is not higher than the second threshold temperature Th2, the control device 70 determines that the power generation stop request at time t1 is a request to stop operation of the fuel cell system 10 after temporal start-up at low temperature, i.e., determines that the power generation stop request at time t1 satisfies the condition of determining that there is a request to stop operation of the fuel cell system 10 after temporal start-up at low temperature, and sets the determination flag Fs indicating that there is a request to stop operation of the fuel cell system 10 after temporal start-up at low temperature is set. (Fs=1).

At this time, the control device 70 as the charge amount adjustment means sets the charge amount when the power generation of the capacitor 16 is stopped to the charge threshold C. The charge threshold C is larger than the charge threshold in the case where operation of the fuel cell system 10 started at normal temperature, and stopped at normal temperature. Thus, even if operation of the fuel cell system 10 is stopped after temporal start-up at low temperature, the scavenging process is performed by the capacitor 16 reliably, and the next time, operation of the fuel cell system 10 is started reliably at low temperature such as the temperature below the freezing point.

The charge amount is adjusted by the control device 70 as the charging amount adjustment means to satisfy the magnitude relationship of "the charge threshold C (corresponding to the charge amount at the time of operation stop after temporal start-up at low temperature)>the charge threshold B (corresponding to the charge amount at the time of operation stop after start-up at low temperature)>the charge threshold A (corresponding to the charge amount at the time of operation stop at normal temperature). Therefore, in the respective determination conditions, the time required for charging the capacitor 16 after the power generation stop request is minimized.

In practice, the control device 70 as the determination means determines that there is a request to stop operation of the fuel cell system 10 after temporal start-up at low temperature, if the temperature Th=Txstart of the gas in the hydrogen discharge port 22 of the fuel cell 14 when operation of the fuel cell system 10 is started before the power generation stop request is not higher than the first threshold temperature Tth1, and the temperature Th=Txstop of the gas in the hydrogen discharge port 22 of the fuel cell 14 when the power generation stop request is inputted is not higher the second threshold temperature Tth2 which is higher than the first threshold temperature Tth1. In this manner, the determination is made reliably.

In the above-described embodiment, at low temperature such as the temperature below the freezing point, when it is detected that the ignition switch is turned off (t1) a short period of time after the ignition switch is turned on (to), the charge threshold Cth is changed to the charge threshold C having a larger value, and charging of the capacitor 16 is performed based on the changed charge threshold C (t1 to t2). Also, a scavenging process is performed for a sufficient period of time. Then, at the time of starting operation of the fuel cell system 10 at low temperature below the freezing temperature or the like the next time, by the electrical energy stored in the capacitor 16, the fuel cell 14 is warmed rapidly by the heater 64 or the like to reliably start operation of the fuel cell system 10.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A method of adjusting the charge amount for an energy storage of a fuel cell system by a control device, said fuel cell system comprising a fuel cell for performing power generation using reactant gases supplied to said fuel cell, an energy storage for assisting the output of said fuel cell, electrical energy from said fuel cell being charged in said energy storage, an air compressor that is driven by electrical energy supplied from said energy storage and that performs a scavenging process for said fuel cell, wherein said control device determines whether the scavenging process is required during power generation by said fuel cell system, the method comprising:
   a first step of confirming whether the scavenging process is required or not at the time of a power generation stop request; and
   a second step of charging said energy storage by said fuel cell when the power generation operation is stopped, up to a predetermined normal charge amount in a case where it is determined that the scavenging process is not required at the time of a power generation stop request, and up to a predetermined low temperature charge amount in a case where it is determined that the scavenging process is required at the time of a power generation stop request, said predetermined low temperature charge amount being larger than said predetermined normal charge amount.

2. A charge amount adjustment method according to claim 1, wherein said fuel cell system further comprises a temperature sensor for detecting a temperature of said fuel cell; and a timer for counting a driving period from an operation start time to a time of the power generation stop request, and
   wherein the method further comprises a third step of, when it is confirmed in the first step that the scavenging process is required, determining that the power generation stop request is a request after a temporal start-up if said driving period is equal to or shorter than a predetermined period of time, if said fuel cell is started up at a temperature not higher than a predetermined first threshold temperature, and if a temperature of said fuel cell at the time of the power generation stop request is not higher than a predetermined second threshold temperature which is higher than said first threshold temperature, and charging said energy storage by said fuel cell when the power generation operation is stopped up to a predetermined low temperature temporal start-up charge amount, said predetermined low temperature temporal start-up charge amount being larger than said predetermined low temperature charge amount.

3. A charge amount adjustment method according to claim 1, wherein said fuel cell system further comprises an outside air temperature sensor for detecting a temperature outside of said fuel cell system, and a heater for warming said fuel cell, and
   wherein the method further comprises a third step of energizing said heater by the electrical energy charged in said energy storage to warm said fuel cell in a case where the outside air temperature detected by said outside air temperature sensor at the time of staring up said fuel cell is below a freezing point.

* * * * *